(12) United States Patent
Onggosanusi et al.

(10) Patent No.: US 9,161,256 B2
(45) Date of Patent: Oct. 13, 2015

(54) CQI FEEDBACK STRUCTURE

(71) Applicant: TEXAS INSTRUMENTS INCORPORATED, Dallas, TX (US)

(72) Inventors: Eko N. Onggosanusi, Allen, TX (US); Runhua Chen, Plano, TX (US); Tarik Muharemovic, Pearland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/265,553

(22) Filed: Apr. 30, 2014

(65) Prior Publication Data

US 2014/0226518 A1 Aug. 14, 2014

Related U.S. Application Data

(63) Continuation of application No. 12/405,983, filed on Mar. 17, 2009, now Pat. No. 8,724,684.

(60) Provisional application No. 61/038,869, filed on Mar. 24, 2008.

(51) Int. Cl.
*H04B 17/00* (2015.01)
*H04L 25/00* (2006.01)
(Continued)

(52) U.S. Cl.
CPC ............ *H04W 24/10* (2013.01); *H04B 17/309* (2015.01); *H04B 17/382* (2015.01); *H04L 5/0007* (2013.01); *H04L 25/0204* (2013.01)

(58) Field of Classification Search
CPC ........... H04B 17/0042; H04B 17/0077; H04B 7/0417; H04B 7/063; H04B 7/0639; H04B 7/0486; H04B 7/0626; H04B 7/0469; H04B 7/0632; H04B 7/065; H04B 7/0452; H04B 7/0613; H04B 7/0478; H04B 17/309; H04B 17/382; H04B 7/068; H04W 24/10; H04L 5/0007
USPC .................................................. 375/224–228
See application file for complete search history.

(56) References Cited

U.S. PATENT DOCUMENTS 5,144,642 A * 9/1992 Weinberg et al. ............. 375/228
8,112,092 B2 2/2012 Yamada et al.
(Continued)

FOREIGN PATENT DOCUMENTS

KR 102005-0078640 8/2005

OTHER PUBLICATIONS

Sharp, "Consideration of CQI, PMI, and rank report feedback interval", 3GPP TSG-RAN WG1 Meeting #50bis Shanghai, China, Oct. 8-12, 2007.
(Continued)

*Primary Examiner* — Qutbuddin Ghulamali
(74) *Attorney, Agent, or Firm* — Ronald O. Neerings; Frank D. Cimino

(57) ABSTRACT

Embodiments of the present disclosure provide a reporting allocation unit, an indicator interpretation unit and methods of operating a reporting allocation unit and an indicator interpretation unit. In one embodiment, the reporting allocation unit includes an indicator configuration module configured to provide reporting interval and offset values of corresponding rank and channel quality indicators for user equipment. The reporting allocation unit also includes a sending module configured to transmit the reporting interval and offset values to the user equipment.

10 Claims, 4 Drawing Sheets

(51) Int. Cl.
*H04W 24/10* (2009.01)
*H04L 5/00* (2006.01)
*H04B 17/309* (2015.01)
*H04B 17/382* (2015.01)
*H04L 25/02* (2006.01)

(56) References Cited

U.S. PATENT DOCUMENTS

| | | |
|---|---|---|
| 8,630,184 B2 | 1/2014 | Kim et al. |
| 8,743,801 B2 | 6/2014 | Englund et al. |
| 2003/0087605 A1 | 5/2003 | Das et al. |
| 2008/0043867 A1* | 2/2008 | Blanz et al. ................. 375/260 |
| 2008/0057969 A1* | 3/2008 | Agami et al. ................. 455/450 |
| 2008/0219370 A1 | 9/2008 | Onggosanusi et al. |
| 2011/0019637 A1 | 1/2011 | Ojala et al. |

OTHER PUBLICATIONS

Sharp, "Proposal for CQI feedback reconfiguration", 3GPP TSG-RAN WG1 Meeting #50bis Shanghai, China, Oct. 8-12, 2007.

Sharp, "Further clarification for the periodic reporting on PUSCH", 3GPP TSG-RAN WG1 Meeting #52, Shenzhen, China, Mar. 31-Apr. 4, 2008.

Texas Instruments, "Remaining Issues on CQI/PMI/RI Reporting", 3GPP TSG-RAN WG1 Meeting #52bis, Shenzhen, China, Mar. 31-Apr. 4, 2008.

Texas Instruments, "Physical Layer Parameters for CQI Reporting", 3GPP TSG-RAN WG1 Meeting #52bis, Shenzhen, China, Mar. 31-Apr. 4, 2008.

Ericsson, "Physical-Layer Parameters to be configured by RRC, explanations", 3GPP TSG-RAN WG1 Meeting #53, Kansas City, US, May 6-9, 2008.

Texas Instruments, "Update on Physical Layer Parameters for CQI Reporting", 3GPP TSG-RAN WG1 Meeting #53bis, Warsaw, Poland, Jun. 30-Jul. 4, 2008.

Texas Instruments, "Reference for CQI/PMI Reporting Offset", 3GPP TSG-RAN WG1 Meeting #53bis, Warsaw, Poland, Jun. 30-Jul. 4, 2008.

Philips, "Configuration of CQI modes", 3GPP TSG-RAN WG1 Meeting #53bis, Warsaw, Poland, Jun. 30-Jul. 4, 2008.

Catt, Texas Instruments, "Physical Layer Parameters for CQI Reporting in TDD", 3GPP TSG-RAN WG1 Meeting #53bis, Warsaw, Poland, Jun. 30-Jul. 4, 2008.

3rd Generation Partnership Project; Technical Specification Group Radio Access Network; Evolved Universal Terrestrial Radio Access (E-UTRA); Physical layer procedures (Release 8); 3GPP TS 36.213 V8.2.0 (Mar. 2008).

3rd Generation Partnership Project; Technical Specification Group Radio Access Network; Evolved Universal Terrestrial Radio Access (E-UTRA) Radio Resource Control (RRC); Protocol specification (Release 8); 3GPP TS 36.331 V8.1.0 (Mar. 2008).

* cited by examiner

FIG. 2A ($v_{RI} = 0$)

| SUBFRAME | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | RI | WB CQI/PMI | | WB CQI/PMI | | WB CQI/PMI | | WB CQI/PMI | RI | WB CQI/PMI | | WB CQI/PMI | | WB CQI/PMI | | WB CQI/PMI | RI | WB CQI/PMI | | WB CQI/PMI |

| SUBFRAME | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | RI | | WB CQI/PMI | | WB CQI/PMI | | WB CQI/PMI | | RI | | WB CQI/PMI | WB CQI/PMI | WB CQI/PMI | | WB CQI/PMI | | RI | | WB CQI/PMI | |

250

CQI FEEDBACK STRUCTURE

CROSS-REFERENCE TO PROVISIONAL APPLICATION

This application is a Continuation of application Ser. No. 12/405,983 filed. Mar. 17, 2009, which claims the benefit of U.S. Provisional Application Ser. No. 61/038,869, filed by Eko N. Onggosanusi and Runhua Chen on Mar. 24, 2008, entitled "CQI Reporting Configuration", commonly assigned with this application and incorporated herein by reference.

This application also claims the benefit of U.S. Provisional Application Ser. No. 61/041,779, filed by Eko N. Onggosanusi and Runhua Chen on Apr. 2, 2008, entitled "CQI Reporting Configuration", commonly assigned with this application and incorporated herein by reference.

This application additionally claims the benefit of U.S. Provisional Application Ser. No. 61/043,272, filed by Eko N. Onggosanusi and Runhua Chen on Apr. 8, 2008, entitled "CQI Feedback Structure", commonly assigned with this application and incorporated herein by reference.

This application further claims the benefit of U.S. Provisional Application Ser. No. 61/044,708, filed by Eko N. Onggosanusi and Runhua Chen on Apr. 14, 2008, entitled "CQI Feedback Structure", commonly assigned with this application and incorporated herein by reference.

This application yet further claims the benefit of U.S. Provisional Application Ser. No. 61/052,544, filed by Eko N. Onggosanusi and Runhua Chen on May 12, 2008, entitled "CQI Feedback Structure", commonly assigned with this application and incorporated herein by reference.

This application still further claims the benefit of U.S. Provisional Application Ser. No. 61/077,761, filed by Eko N. Onggosanusi and Runhua Chen on Jul. 2, 2008, entitled "CQI Feedback Structure", commonly assigned with this application and incorporated herein by reference.

TECHNICAL FIELD

The present disclosure is directed, in general, to a communication system and, more specifically, to a reporting allocation unit, an indicator interpretation unit and methods of operating a reporting allocation unit and an indicator interpretation unit.

BACKGROUND

A key principle in orthogonal frequency division multiple access (OFDMA) communication systems is that the total operating bandwidth is divided into non-overlapping sub-bands, also called resource blocks (RBIs), where transmissions for user equipment (UE) occur in an orthogonal (i.e., not mutually interfering) manner. Each RE can potentially carry data to a different UE. More typically, each UE having a sufficiently high signal-to-interference and noise ratio (SINR) will use a well-chosen set of RBs, so that the spectral efficiency of the transmission is maximized according to the operating principle of a scheduler.

By scheduling each UE on RBs where it has high SINR, the data rate transmitted to each UE, and therefore the overall system throughput, can be optimized according to the scheduling principle. To enable more optimum frequency domain scheduling of UEs in the RBs of the operating bandwidth, each UE feeds back a channel quality indicator (CQI) it might potentially experience for each RB or each combination of RBs to its serving base station (Node B). Additionally, a transmission rank indicator (RI) that determines the number of data layers multiplexed in the spatial domain is also fed back. Improvements in the selection and feed back of rank and channel quality indicators would prove beneficial in the art.

SUMMARY

Embodiments of the present disclosure provide a reporting allocation unit, an indicator interpretation unit and methods of operating a reporting allocation unit and an indicator interpretation unit. In one embodiment, the reporting allocation unit includes an indicator configuration module configured to provide reporting interval and offset values of corresponding rank and channel quality indicators for user equipment. The reporting allocation unit also includes a sending module configured to transmit the reporting interval and offset values to the user equipment.

In another embodiment, the indicator interpretation unit includes a receive module configured to receive reporting interval and offset values for corresponding rank and channel quality indicators from a base station. The indicator interpretation unit also includes a reporting configuration module configured to provide the reporting interval and offset values for feeding back the corresponding rank and channel quality indicators to the base station.

In another aspect, the method of operating the reporting allocation unit includes providing reporting interval and offset values of corresponding rank and channel quality indicators for user equipment and transmitting the reporting interval and offset values to the user equipment.

In yet another aspect, the method of operating the indicator interpretation unit includes receiving reporting interval and offset values for corresponding rank and channel quality indicators from a base station and providing the reporting interval and offset values for feeding back the corresponding rank and channel quality indicators to the base station.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIGS. 2A and 2B illustrate diagrams of reporting structures as may be employed in the downlink and uplink portions of FIGS. 1A and 1B.

DETAILED DESCRIPTION

To support MIMO transmission, the following reports are supported for E-UTRA (Evolved UMTS Terrestrial Radio Access) Long Term Evolution (LTE). A rank indicator (RI) report that enables a Node B to adapt a transmission rank (the number of spatial streams or layers for spatial multiplexing) in spatial multiplexing. A channel quality indicator (CQI) report for closed-loop spatial multiplexing, wherein one CQI is reported for one code word (rank-1) transmission and two CQIs, each corresponding to one code word, are reported for a two code word (i.e., rank greater than one) transmission. For open-loop spatial multiplexing, only one CQI is reported. A precoding matrix indicator (PMI) report that is only used for closed-loop spatial multiplexing. Embodiments of the present disclosure provide reporting structures for these reports.

Figure 1A:
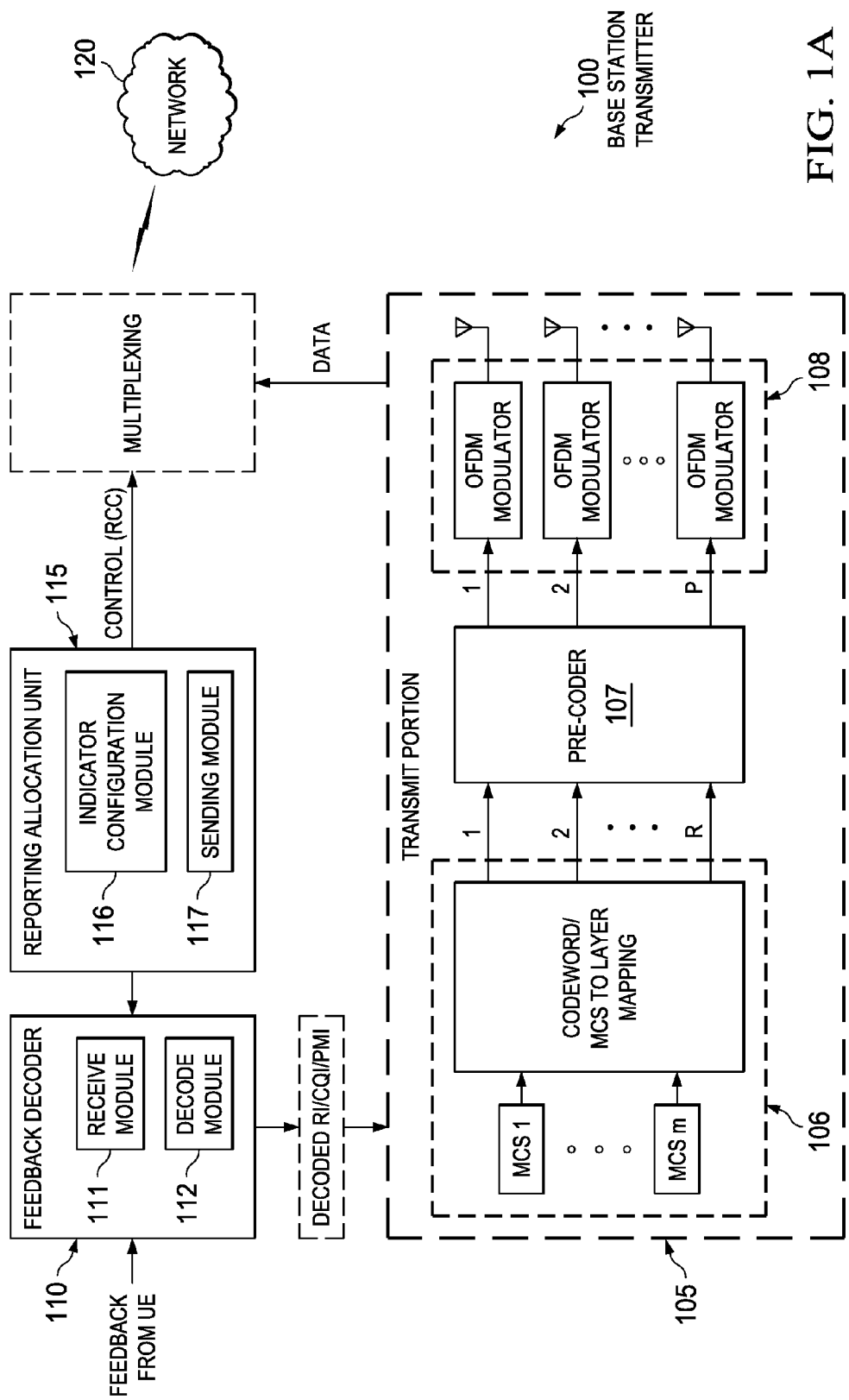
FIGS. 1A and 1B illustrate diagrams of a downlink portion and an uplink portion of a communications system as provided by one embodiment of the disclosure.
Figure 1B:
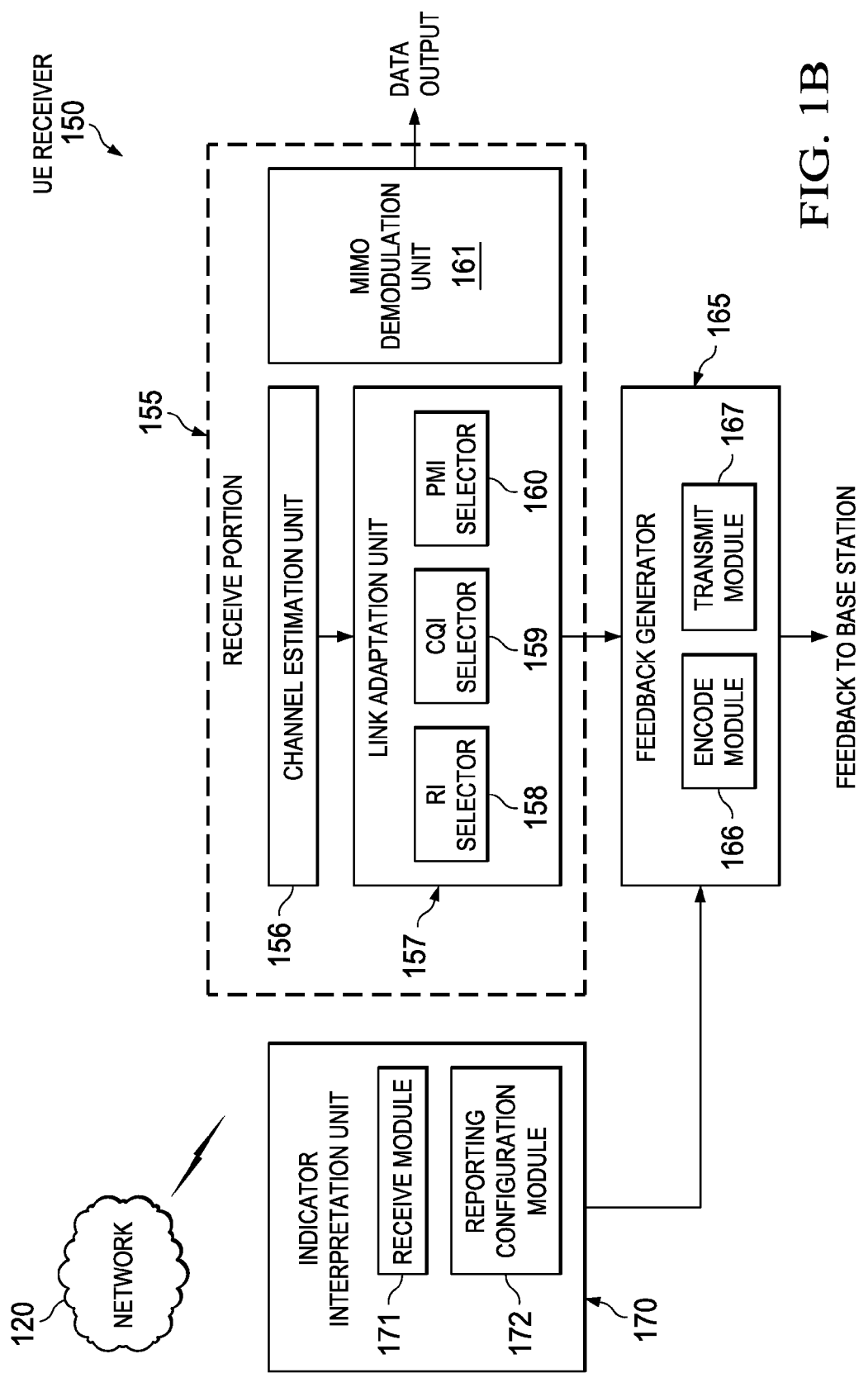

FIGS. 1A and 1B illustrate diagrams of a downlink portion 100 and an uplink portion 150 of a communications system as provided by one embodiment of the disclosure. In the illustrated embodiment, the communications system is an orthogonal frequency division multiple access (OFDMA) system, which provides a total operating bandwidth divided into non-overlapping RBs. The RBs provide transmissions for different UEs that occur in an orthogonal or substantially independent manner wherein each RB can potentially carry data to a different UE.

FIG. 1A illustrates a system diagram of the downlink portion 100, which corresponds to a base station transmitter (Node B) and includes a transmit portion 105, a feedback decoder 110 and a reporting allocation unit 115. The transmit portion 105 includes a modulation and coding scheme (MCS) module 106, a precoder module 107 and an OFDM module 108 having multiple OFDM modulators that feed corresponding transmit antennas.

The feedback decoder 110 includes a receive module 111 and a decode module 112. The receive module 111 receives transmission rank indicator (RI) and channel quality indicator (CQI) information as well as precoding matrix indicator (PMI) selections that have been fed back from user equipment. The decoding module 112 extracts the RI, CQI and PMI selections wherein they are provided to the transmit portion 105 to allow efficient data transmission over multiple antennas through a communication network 120.

The MCS module 106 employs the RI selection to map input data to indicated spatial streams (1-R). A scheduling function (not specifically shown) employs the CQI selection to assign RBs to each of the user equipment. The precoder module 107 then maps the spatial streams linearly into output data streams for transmission by the OFDM module 108 over the communication network 120.

The reporting allocation unit 115 includes an indicator configuration module 116 and a sending module 117. The indicator configuration module 116 is configured to provide reporting interval and offset values of corresponding rank and channel quality indicators for user equipment. The sending module 117 is configured to transmit the reporting interval and offset values to the user equipment. The reporting interval and offset values are sent by a radio resource control (RRC) channel through the communication network 120 to inform the UE of the structure to be used to feed back RI, CQI and PMI selections to the feedback decoder 110. The reporting interval and offset values are also provided to the feedback decoder 110 for decoding purposes.

FIG. 1B illustrates a system diagram of the uplink portion 150 as provided by one embodiment of the disclosure. In the illustrated embodiment, the uplink portion 150 corresponds to a UE receiver and includes a receive portion 155, a feedback generator 165 and an indicator interpretation unit 170.

The receive portion 155 includes a channel estimation unit 156, a link adaptation unit 157 and a MIMO demodulation unit 161.

The receive portion 155 is primarily employed to receive data signals from a transmission corresponding to RI, CQI and PMI information wherein the MIMO demodulation unit 161 ultimately provides data output. The channel estimation unit 156 employs previously transmitted channel estimation signals to provide the channel estimates need by the receive portion 155. The link adaptation unit 157 includes an RI selector 158, a CQI selector 159 and a PMI selector 160. The rank selector 158 provides a transmission rank selection. The CQI selector 159 provides a channel quality based on channel estimation and the precoding selector 160 provides a precoding matrix selection.

The feedback generator 165 includes an encode module 166 and a transmit module 167. The encode module 166 accepts the rank, channel quality and precoding matrix selections from the link adaptation unit 157 and encodes them for feeding back based on a reporting structure provided by the indicator interpretation unit 170. The transmit module 167 then feeds back the reporting structure to the downlink portion 100.

The indicator interpretation unit 170 includes a receive module 171 and a reporting configuration module 172. The receive module 171 is configured to receive reporting interval and offset values for corresponding rank and channel quality indicators from the downlink portion 100. The reporting configuration module 172 is configured to provide the reporting interval and offset values to the feed back generator 165 for feeding back the corresponding rank and channel quality indicators to the downlink portion 100.

FIGS. 2A and 2B illustrate diagrams of reporting structures, generally designated 200, 250, as may be employed in the downlink and uplink portions 100, 150 of FIGS. 1A and 1B.

For PUCCH-based periodic reporting, RI may be seen to be reported separately from CQI/PMI. That is, RI and wideband CQI/PMI are not reported in the same subframe (i.e., reporting instance). The reporting interval of the RI report is an integer multiple (M) of the wideband CQI/PMI reporting interval. The same or different offsets between the RI and wideband CQI/PMI reporting instances may be configured. Here, an RI reporting offset $v_{RI}$ may be defined either as an absolute offset or relative to a CQI/PMI reporting offset $v_{CQI}$. Both the reporting interval and offset are configured by higher layers. In the case of a collision of RI and wideband CQI/PMI, the wideband CQI/PMI is dropped.

Denote the reporting interval of RI and CQI/PMI as $\rho_{RI}$ and $\rho_{CQI}$, respectively. Therefore, $\rho_{RI}=M \times \rho_{CQI}$. Two reporting configurations are illustrated in FIGS. 2A and 2B wherein the CQI reporting interval $\rho_{CQI}=2$ (sub-frames) and M=4. FIGS. 2A and 2B correspond to RI offsets of $v_{RI}=0$ and 1, respectively. It may be noted that the set of possible values for $v_{RI}$ depends on the maximum reporting interval for CQI/PMI, which may be denoted as $\rho_{CQI,MAX}$. The set of values for M and $v_{RI}$ is signaled as a part of dedicated system information (e.g., via RRC signaling), as discussed above. With continued reference to FIGS. 1A, 1B, 2A and 2B, several embodiments of reporting structures are presented below.

In a first embodiment, the reporting interval and offset values of the corresponding rank and channel quality indicators may be selected independently. That is, the integer multiple M and the RI reporting offset $v_{RI}$ are defined independently. In this case, the number of values for $v_{RI}$ is simply $\rho_{CQI,MAX}$. Assuming that the set of values for M is $N_M$, the combination of M and $v_{RI}$ (RI reporting configuration) can be represented in ceil($\log_2(N_M \rho_{CQI,MAX})$) bits.

This assumes the following set of values.

$$\rho_{CQI} \in \{\rho_{CQI,1}, \rho_{CQI,2}, \ldots, \rho_{CQI,N_{CQI}}\}$$

$$M \in \{M_1, M_2, \ldots, M_{N_M}\}$$

$$v_{RI} \in \{0, 1, 2, \ldots, \rho_{CQI,MAX} - 1\}$$

$$\rho_{CQI,MAX} = \max\{\rho_{CQI,1}, \rho_{CQI,2}, \ldots, \rho_{CQI,N_{CQI}}\} \quad (1)$$

Note that one of the possible values for $\rho_{CQI}$ or M may represent the OFF configuration (where CQI or RI reporting are turned OFF). In this case, the above can be modified as follows:

$$\rho_{CQI} \in \{\rho_{CQI,1}, \rho_{CQI,2}, \ldots, \rho_{CQI,N_{CQI}-1}, \text{OFF}\}$$

$$M \in \{M_1, M_2, \ldots, M_{N_M-1}, \text{OFF}\}$$

$$v_{RI} \in \{0, 1, 2, \ldots, \rho_{CQI,MAX} - 1\}$$

$$\rho_{CQI,MAX} = \max\{\rho_{CQI,1}, \rho_{CQI,2}, \ldots, \rho_{CQI,N_{CQI}-1}\} \quad (2)$$

With this configuration, the required number of bits to signal the RI reporting configuration is:

$$\text{ceil}(\log_2(N_M \times N_{CQI})) \quad (3)$$

As an example, assume the following set of values (the unit for $\rho_{CQI}$ is subframe, which is equivalent to milliseconds for E-UTRA):

$$\rho_{CQI} \in \{2, 5, 10, 20, 40, \text{OFF}\}$$

$$M \in \{1, 2, 5, 10, 20, 40, \text{OFF}\} \quad (4)$$

Using the sets in (4), the simplistic construction is to choose the possible values for offset $v_{RI} \in \{0, 1, 2, \ldots, 39\}$. This requires ceil($\log_2(7 \times 40)$)=9 bits to signal the RI reporting configuration.

In a second embodiment, the reporting interval and offset values for the rank indicator are limited by a maximum reporting interval of the rank indicator. While the above first embodiment is simple, it results in a number of combinations. Since the CQI-related information may be included as part of a handover message, it is beneficial to keep the number of combinations relatively small and therefore minimize the required number of bits for signaling. With this in mind, the second embodiment may be employed to reduce the number of combinations, as discussed immediately below.

A maximum RI reporting interval $\rho_{RI,MAX}$ is set. This maximum reporting interval is used to exclude the configurations which result in RI reporting intervals larger than $\rho_{RI,MAX}$. Therefore, fulfilling the following condition is required for a given $\rho_{CQI}$ value.

$$M \leq \frac{\rho_{RI,MAX}}{\rho_{CQI}}. \quad (5)$$

The possible values of M and $v_{RI}$ are made dependent on each possible value of $\rho_{CQI}$.

Starting from the set of $\rho_{CQI}$ values in (2) (the same can be done assuming (1)), the following configuration of Table 1 is obtained. For simplicity, assume $\rho_{CQI,n} < \rho_{CQI,n+1}$ and $M_n < M_{n+1}$.

TABLE 1

| $\rho_{CQI}$ | Set of values for M | Set of values for $v_{RI}$ |
|---|---|---|
| $\rho_{CQI,1}$ | $\left\{M_1, \ldots, M_{n(1)}, \text{OFF} \,\middle|\, M_{n(1)} \leq \frac{\rho_{RI,MAX}}{\rho_{CQI,1}}\right\}$ | $\{0, 1, \ldots, \rho_{CQI,1} - 1\}$ |
| $\rho_{CQI,2}$ | $\left\{M_1, \ldots, M_{n(2)}, \text{OFF} \,\middle|\, M_{n(2)} \leq \frac{\rho_{RI,MAX}}{\rho_{CQI,2}}\right\}$ | $\{0, 1, \ldots, \rho_{CQI,2} - 1\}$ |
| $\vdots$ | | |
| $\rho_{CQI,N_{CQI}-1}$ | $\left\{M_1, \ldots, M_{n(N_{CQI}-1)}, \text{OFF} \,\middle|\, M_{n(N_{CQI}-1)} \leq \frac{\rho_{RI,MAX}}{\rho_{CQI,N_{CQI}-1}}\right\}$ | $\{0, 1, \ldots, \rho_{CQI,N_{CQI}-1} - 1\}$ |
| OFF | {OFF} | {0} |

With this configuration, the required number of bits to signal the RI reporting configuration is obtained in (6) below.

$$\text{ceil}(\log_2(\max\{M_{n(m)} \times \rho_{CQI,m}, m=1,2,\ldots,N_{CQI}-1\})) \quad (6)$$

Using the same setup as an example, for the more economical construction (the second example above) with $\rho_{RI,MAX}=100$, the following configuration of Table 2 is obtained.

TABLE 2

| $\rho_{CQI}$ | Set of values for M | Set of values for $v_{RI}$ | No. possible values for a given $\rho_{CQI}$ |
|---|---|---|---|
| 2 | {1, 2, 5, 10, 20, 40, OFF} | {0, 1} | 7 × 2 = 14 |
| 5 | {1, 2, 5, 10, 20, OFF} | {0, 1, 2, 3, 4} | 6 × 5 = 30 |
| 10 | {1, 2, 5, 10, OFF} | {0, 1, 2, 3, . . . , 8, 9} | 5 × 10 = 50 |
| 20 | {1, 2, 5, OFF} | {0, 1, 2, 3, . . . , 18, 19} | 4 × 20 = 80 |
| 40 | {1, 2, OFF} | {0, 1, 2, 3, . . . , 38, 39} | 3 × 40 = 120 |
| OFF | {OFF} | {0} | 1 |

This requires ceil($\log_2(120)$)=7 bits to signal the RI reporting configuration.

In a third embodiment, the offset values of the corresponding rank and channel quality indicators are selected jointly from a same set of offset values. That is, it is also possible to jointly define (and hence encode) the CQI/PMI and RI configurations. This is motivated by the fact that the set of possible offset values is the same for CQI/PMI and RI reporting. Note that the offset value for CQI/PMI reporting is defined in the absolute sense while the offset for RI reporting can be defined relative to the offset for CQI/PMI reporting (although an absolute offset definition is not precluded).

That is, the set of possible offset values for RI reporting solely depends on the periodicity of CQI/PMI reporting. The multiplicative factor M is then defined separately. The joint definition is described as follows in Table 3.

TABLE 3

| $\rho_{CQI}$ | Set of values for $v_{CQI}$ (CQI/PMI reporting). | Set of values for $v_{RI}$ (RI reporting) |
|---|---|---|
| $\rho_{CQI,1}$ | $\{0, 1, \ldots, \rho_{CQI,1} - 1\}$ | $\{0, 1, \ldots, \rho_{CQI,1} - 1\}$ |
| $\rho_{CQI,2}$ | $\{0, 1, \ldots, \rho_{CQI,2} - 1\}$ | $\{0, 1, \ldots, \rho_{CQI,2} - 1\}$ |
| . | | |
| . | | |
| $\rho_{CQI,N_{CQI}-1}$ | $\{0, 1, \ldots, \rho_{CQI,N_{CQI}-1} - 1\}$ | $\{0, 1, \ldots, \rho_{CQI,N_{CQI}-1} - 1\}$ |
| OFF | $\{0\}$ | $\{0\}$ |

With this configuration, the required number of bits to signal the CQI/PMI and RI reporting configuration is $$\text{ceil}\left(\log_2\left(N_M \times \left(1 + \sum_{n=1}^{N_{CQI}} n^2\right)\right)\right). \quad (7)$$

Using the same setup as an example, the following configuration is obtained in Table 4.

TABLE 4

| $\rho_{CQI}$ | Set of values for $v_{CQI}$ (CQI/PMI reporting) | Set of values for $v_{RI}$ (RI reporting) | No. possible values for a given $\rho_{CQI}$ |
|---|---|---|---|
| 2 | $\{0, 1\}$ | $\{0, 1\}$ | $2^2 = 4$ |
| 5 | $\{0, 1, 2, 3, 4\}$ | $\{0, 1, 2, 3, 4\}$ | $5^2 = 25$ |
| 10 | $\{0, 1, 2, 3, \ldots, 8, 9\}$ | $\{0, 1, 2, 3, \ldots, 8, 9\}$ | $10^2 = 100$ |
| 20 | $\{0, 1, 2, 3, \ldots, 18, 19\}$ | $\{0, 1, 2, 3, \ldots, 18, 19\}$ | $20^2 = 400$ |
| 40 | $\{0, 1, 2, 3, \ldots, 38, 39\}$ | $\{0, 1, 2, 3, \ldots, 38, 39\}$ | $40^2 = 1600$ |
| OFF | $\{0\}$ | $\{0\}$ | 1 |

Combined with M (7 possibilities), this results in a total of ceil($\log_2$(2131×7))=14 bits, which is 7 extra bits for the RI configuration relative to the 7 bits needed (ceil($\log_2$(2+5+10+20+40+1))=7) only for CQI/PMI configuration. This results in the same saving compared to the second embodiment above.

In a fourth embodiment, which is a combination of the second and third embodiments, the reporting interval for the rank indicator is limited by a maximum reporting interval and the offset values of the corresponding rank and channel quality indicators are concurrently selected jointly from a same set of offset values.

In addition to the dependency of $v_{RI}$ on $\rho_{CQI}$, the set of possible values of M is also made dependent on $\rho_{CQI}$ by setting a maximum RI reporting interval $\rho_{RI,MAX}$ as described in the second embodiment. This combination can be described as follows in Table 5 below.

TABLE 5

| $\rho_{CQI}$ | Set of values for M | Set of values for $v_{CQI}$ | Set of values for $v_{RI}$ |
|---|---|---|---|
| $\rho_{CQI,1}$ | $\left\{M_1, \ldots, M_{n(1)}, \text{OFF} \mid M_{n(1)} \leq \frac{\rho_{RI,MAX}}{\rho_{CQI,1}}\right\}$ | $\{0, 1, \ldots, \rho_{CQI,1} - 1\}$ | $\{0, 1, \ldots, \rho_{CQI,1} - 1\}$ |
| $\rho_{CQI,2}$ | $\left\{M_1, \ldots, M_{n(2)}, \text{OFF} \mid M_{n(2)} \leq \frac{\rho_{RI,MAX}}{\rho_{CQI,2}}\right\}$ | $\{0, 1, \ldots, \rho_{CQI,2} - 1\}$ | $\{0, 1, \ldots, \rho_{CQI,2} - 1\}$ |
| . | | | |
| . | | | |
| $\rho_{CQI,N_{CQI}-1}$ | $\left\{M_1, \ldots, M_{n(N_{CQI}-1)}, \text{OFF} \mid M_{n(N_{CQI}-1)} \leq \frac{\rho_{RI,MAX}}{\rho_{CQI,N_{CQI}-1}}\right\}$ | $\{0, 1, \ldots, \rho_{CQI,N_{CQI}-1} - 1\}$ | $\{0, 1, \ldots, \rho_{CQI,N_{CQI}-1} - 1\}$ |
| OFF | $\{\text{OFF}\}$ | $\{0\}$ | $\{0\}$ |

With this configuration, the required number of bits to signal the CQI/PMT and RI reporting configuration is:

$$\text{ceil}\left(\log_2\left(1 + \sum_{n=1}^{N_{CQI}} M_{n(m)} \times n^2\right)\right) \quad (8)$$

Using the same setup as an example, the following configuration of Table 6 is obtained.

TABLE 6

| $\rho_{CQI}$ | Set of values for $v_{CQI}$ (CQI/PMI reporting) | Set of values for $v_{RI}$ (RI reporting) | Set of values for M | No. possible values for a given $\rho_{CQI}$ |
|---|---|---|---|---|
| 2 | $\{0, 1\}$ | $\{0, 1\}$ | $(1, 2, 5, 10, 20, 40, \text{OFF})$ | $7 \times 2^2 = 28$ |
| 5 | $\{0, 1, 2, 3, 4\}$ | $\{0, 1, 2, 3, 4\}$ | $\{1, 2, 5, 10, 20, \text{OFF}\}$ | $6 \times 5^2 = 150$ |

TABLE 6-continued

| $\rho_{CQI}$ | Set of values for $v_{CQI}$ (CQI/PMI reporting) | Set of values for $v_{RI}$ (RI reporting) | Set of values for M | No. possible values for a given $\rho_{CQI}$ |
|---|---|---|---|---|
| 10 | {0, 1, 2, 3, ..., 8, 9} | {0, 1, 2, 3, ..., 8, 9} | {1, 2, 5, 10, OFF} | $5 \times 10^2 = 500$ |
| 20 | {0, 1, 2, 3, ..., 18, 19} | {0, 1, 2, 3, ..., 18, 19} | {1, 2, 5, OFF} | $4 \times 20^2 = 1600$ |
| 40 | {0, 1, 2, 3, ..., 38, 39} | {0, 1, 2, 3, ..., 38, 39} | {1, 2, OFF} | $3 \times 40^2 = 4800$ |
| OFF | {0} | {0} | {OFF} | 1 |

This result provides a total of ceil(log$_2$(28+150+500+1600+4800+1))=13 bits, which is 6 extra bits for the RI configuration relative to the 7 bits needed (ceil(log$_2$(2+5+10+20+40+1))=7) only for the CQI/PMI configuration.

It may be noted that modifications to the above embodiments are included in this disclosure as long as they maintain the structure. For instance, it is possible to exclude an OFF configuration for $\rho_{CQI}$ or M as indicated in (1). Furthermore, it is possible to further restrict the possible offset values v as a subset of {0, 1, 2, ..., $\rho_{CQI,n}$–1}. That is, not all possible offset values from zero to $\rho_{CQI,n}$–1 are used. Other extensions and variations are also possible. The above embodiments may be combined with other schemes to further restrict the number of configurations.

Regarding the definition of the offset values, it is important to define an absolute reference which can be used for defining the CQI/PMI reporting offset $v_{CQI}$. In addition, it may also be used to define the RI reporting offset $v_{RI}$ if it is defined as an absolute offset (instead of a relative offset). Since the CQI/PMI reporting periodicity (interval) $\rho_{CQI}$(ms) may be a multiple of a radio frame duration, the absolute reference cannot be defined within a 10 ms radio frame. Additionally, the offset value is a multiple of one subframe duration (1 ms).

Hence, the reference and the offset definition may be defined as a function of the subframe number within the CQI/PMI reporting periodicity (interval) $\rho_{CQI}$. Alternatively, the maximum CQI/PMI reporting periodicity can also be used. The subframe number can be enumerated based on the system frame number (SFN, which starts at zero) and the number of subframes per radio frame (equals ten in E-UTRA).

For instance, the first subframe (subframe zero) within the $\rho_{CQI}$ time frame is used as the absolute offset reference. The CQI/PMI reporting offset $v_{CQI}$ is defined relative to the absolute reference. Hence, the offset can be written as follows:

$$v_{CQI} = (SFN \times 10 + n) \mathrm{mod}\left(\frac{\rho_{CQI}}{T_{subframe}}\right), \text{ or} \quad (9)$$

$$v_{CQI} = \left(SFN \mathrm{mod}\left(\left\lceil\frac{\rho_{CQI}}{T_{frame}}\right\rceil\right)\right) \times 10 + n. \quad (10)$$

Here, $T_{subframe}$=1 ms and $T_{frame}$=10 ms f for E-UTRA and n is the offset index (0, 1, 2, ..., 9) within one radio frame (following the fact that there are 10 subframes within one radio frame). Essentially, this defines the valid locations (in terms of subframes) of the CQI/PMI reports for a given CQI/PMI reporting offset parameter $v_{CQI}$, which may be configured by the network via a higher layer or broadcast signaling.

A simplification may be obtained by expressing the CQI/PMI reporting periodicity in terms of subframes. In this case, the above formula can be simplified as $v_{CQI}$=(SFN×10+n) mod $P_{CQI}$, where $P_{CQI}$ is the CQI/PMI reporting intervals defined in subframes. For example, it $\rho_{CQI}$=40 ms (multiple of 10 ms), the above equations become $$v_{CQI}=(\mathrm{SFN}\times10+n)\mathrm{mod}\ 40, \text{ or} \quad (11)$$

$$v_{CQI}=(\mathrm{SFN\ mod\ 4})\times10+n. \quad (12)$$

Therefore, if a CQI/PMI reporting is assigned an offset corresponding to the offset index of five (where indexing starts at zero) starting in radio frame with SFN=35, the resulting $v_{CQI}$ is 35. For example, if $\rho_{CQI}$=5 ms(< 10 ms), the above equations become $$v_{CQI}=(\mathrm{SFN}\times10+n)\mathrm{mod}\ 5, \text{ or} \quad (13)$$

$$v_{CQI}=n. \quad (14)$$

As mentioned, it is also possible to define a reference using the maximum/worst-case CQI/PMI reporting periodicity/interval $\rho_{CQI,MAX}$ regardless of $\rho_{CQI}$. In this case, the equations become $$v_{CQI} = (SFN \times 10 + n)\mathrm{mod}\left(\frac{\rho_{CQI,MAX}}{T_{subframe}}\right), \text{ or} \quad (15)$$

$$v_{CQI} = \left(SFN \mathrm{mod}\left(\left\lceil\frac{\rho_{CQI,MAX}}{T_{frame}}\right\rceil\right)\right) \times 10 + n. \quad (16)$$

For instance, if $\rho_{CQI,MAX}$=160 ms, the above equations become $$v_{CQI}=(\mathrm{SFN}\times10+n)\mathrm{mod}\ 160, \text{ or} \quad (17)$$

$$v_{CQI}=(\mathrm{SFN\ mod\ 16})\times10+n. \quad (18)$$

The equations will be used regardless of the reporting periodicity $\rho_{CQI}$.

While the above embodiments are described for CQI/PMI reporting, the principles may also be applied to other periodic transmissions. One example is the transmission of an uplink sounding reference signal, which shares similar structures as that for CQI/PMI reporting. In particular, the same offset definition can be used where $v_{SRS}$=(SFN×10+n)mod $P_{SRS}$. Here, $P_{SRS}$ is the SRS reporting periodicity and n is the offset index (0, 1, 2, ..., 9) within one radio frame. This defines the valid location (in terms of subframes) for SRS reporting given the offset parameter $v_{SRS}$, which is configured by the network via higher layer or broadcast signaling.

Figure 3:
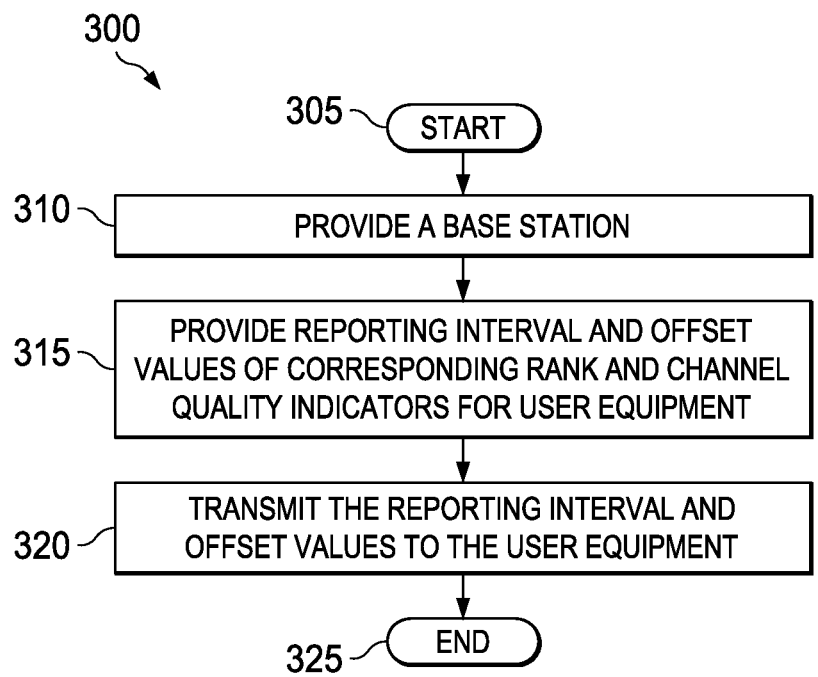
FIG. 3 illustrates a flow diagram of an embodiment of a method of operating a reporting allocation unit carried out according to the principles of the present disclosure.

FIG. 3 illustrates a flow diagram of an embodiment of a method of operating a reporting allocation unit, generally designated 300, carried out according to the principles of the present disclosure. The method 300 is for use in a base station and starts in a step 305. Then, in a step 310, the base station is provided and reporting interval and offset values of corresponding rank and channel quality indicators for user equipment are provided in a step 315. The reporting interval and offset values are transmitted to the user equipment in a step 320.

In one embodiment, the reporting interval and offset values of the corresponding rank and channel quality indicators are selected independently. In another embodiment, the reporting interval and offset values for the rank indicator are limited by a maximum reporting interval of the rank indicator. In yet another embodiment, the offset values of the corresponding rank and channel quality indicators are selected jointly from a same set of offset values. In still another embodiment, the reporting interval for the rank indicator is limited by a maximum reporting interval of the rank indicator and the offset values of the corresponding rank and channel quality indicators are concurrently selected jointly from a same set of offset values. In a further embodiment, the offset values are derived as a function of a system frame number parameter. The method 300 ends in a step 325.

Figure 4:
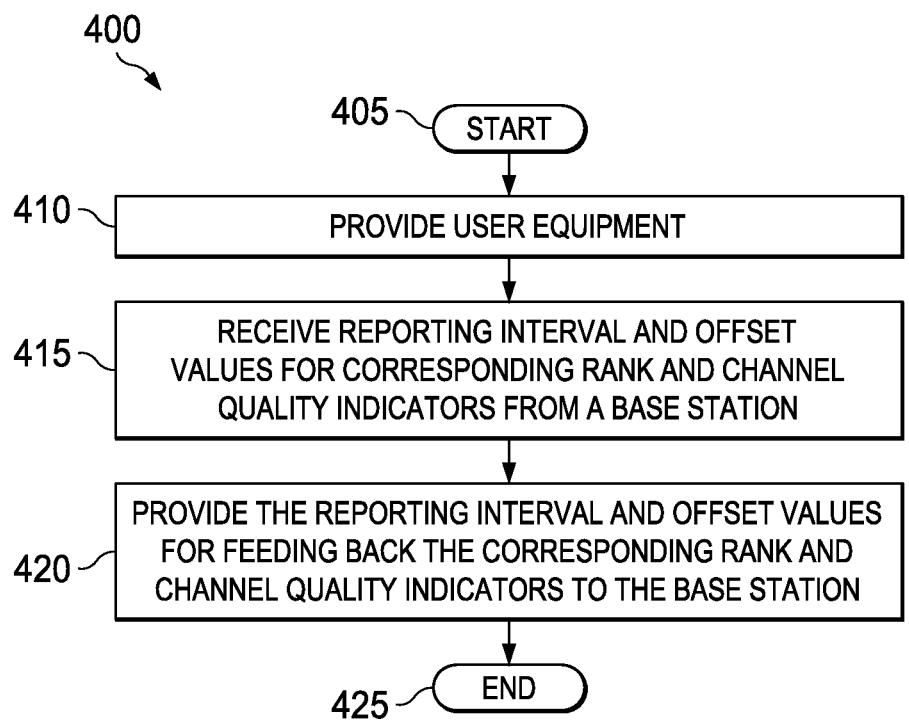
FIG. 4 illustrates a flow diagram of an embodiment of a method of operating an indicator reception unit carried out according to the principles of the present disclosure.

FIG. 4 illustrates a flow diagram of an embodiment of a method of operating an indicator reception unit, generally designated 400, carried out according to the principles of the present disclosure. The method 400 is for use in user equipment and starts in a step 405. Then, in a step 410, the user equipment is provided and reporting interval and offset values for corresponding rank and channel quality indicators are received from a base station in a step 415. The reporting interval and offset values are provided for feeding back the corresponding rank and channel quality indicators to the base station in a step 420.

In one embodiment, the reporting interval and offset values of the corresponding rank and channel quality indicators are selected independently. In another embodiment, the reporting interval and offset values for the rank indicator are limited by a maximum reporting interval of the rank indicator. In yet another embodiment, the offset values of the corresponding rank and channel quality indicators are selected jointly from a same set of offset values. In still another embodiment, the reporting interval for the rank indicator is limited by a maximum reporting interval of the rank indicator and the offset values of the corresponding rank and channel quality indicators are concurrently selected jointly from a same set of offset values. In a further embodiment, the offset values are derived as a function of a system frame number parameter. The method 400 ends in a step 425.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A user equipment, comprising:
   a receive module configured to receive reporting interval and offset values for corresponding rank and channel quality indicators from a base station; and
   a reporting configuration module configured to feed back the corresponding rank and channel quality indicators to the base station using the received reporting interval and offset values.

2. The user equipment as recited in claim 1 wherein the reporting interval and offset values of the corresponding rank and channel quality indicators are selected independently.

3. The user equipment as recited in claim 1 wherein the reporting interval and offset values for the rank indicator are limited by a maximum reporting interval of the rank indicator.

4. The user equipment as recited in claim 1 wherein the reporting interval and offset values of the corresponding rank and channel quality indicators are selected jointly.

5. The user equipment as recited in claim 1 wherein the offset values are derived as a function of a system frame number parameter.

6. A method of operating an user equipment, comprising:
   receiving reporting interval and offset values for corresponding rank and channel quality indicators from a base station; and
   feeding back the corresponding rank and channel quality indicators to the base station using the received reporting interval and offset values.

7. The method as recited in claim 6 wherein the reporting interval and offset values of the corresponding rank and channel quality indicators are selected independently.

8. The method as recited in claim 6 wherein the reporting interval and offset values for the rank indicator are limited by a maximum reporting interval of the rank indicator.

9. The method as recited in claim 6 wherein the reporting interval and offset values of the corresponding rank and channel quality indicators are selected jointly.

10. The method as recited in claim 6 wherein the offset values are derived as a function of a system frame number parameter.

* * * * *